United States Patent [19]
Couzin

[11] Patent Number: 5,854,709
[45] Date of Patent: Dec. 29, 1998

[54] CHAMELEONIC CUBE CORNERS

[75] Inventor: Dennis I. Couzin, Evanston, Ill.

[73] Assignee: Stimsonite Corporation, Niles, Ill.

[21] Appl. No.: 881,595

[22] Filed: Jun. 24, 1997

[51] Int. Cl.$^6$ .............................. G02B 5/122; G02B 5/124
[52] U.S. Cl. ........................ 359/529; 359/530; 359/531; 359/532; 404/14
[58] Field of Search ................................. 359/529–533; 404/9, 12, 14, 16

[56] References Cited

U.S. PATENT DOCUMENTS

| | | |
|---|---|---|
| 4,208,090 | 6/1980 | Heenan . |
| 4,486,363 | 12/1984 | Pricone et al. . |
| 4,618,518 | 10/1986 | Pricone et al. . |
| 4,703,999 | 11/1987 | Benson . |
| 4,801,193 | 1/1989 | Martin . |

OTHER PUBLICATIONS

*Introduction to Optics,* Pedrotti, et al., "Two–Layer Antireflecting Films", Sec. 22–3, Prentice–Hall, Inc. 1987. (No Month).

Primary Examiner—James Phan
Attorney, Agent, or Firm—Jones, Day, Reavis & Pogue

[57] ABSTRACT

A retroreflector construction comprises a first transparent layer of a relatively high refractive index having on its rear surface one or more cube corner retroreflector elements; a second thin transparent layer of relatively low refractive index in substantially uninterrupted contact with the rear surface of the first layer; and a third metallic reflective layer in substantially uninterrupted contact with the rear surface of the second layer. The ratio of the indices of refraction of the two transparent layers is sufficient to allow TIR at their interface for at least some of the cube faces. The third, metallic layer assures face reflection when TIR fails. The construction provides greater retroreflectance than would be achieved with a single metallized transparent layer, and provides retroreflectance over a broader range of entrance angles and orientation angles than would be achieved with a single non-metallized (air-backed) transparent layer. The construction provides a greater structural integrity than can be achieved with air-backed construction. The front surface of the first transparent layer optionally may be provided with a transparent overlay. A method of making the retroreflector is also disclosed.

20 Claims, 3 Drawing Sheets

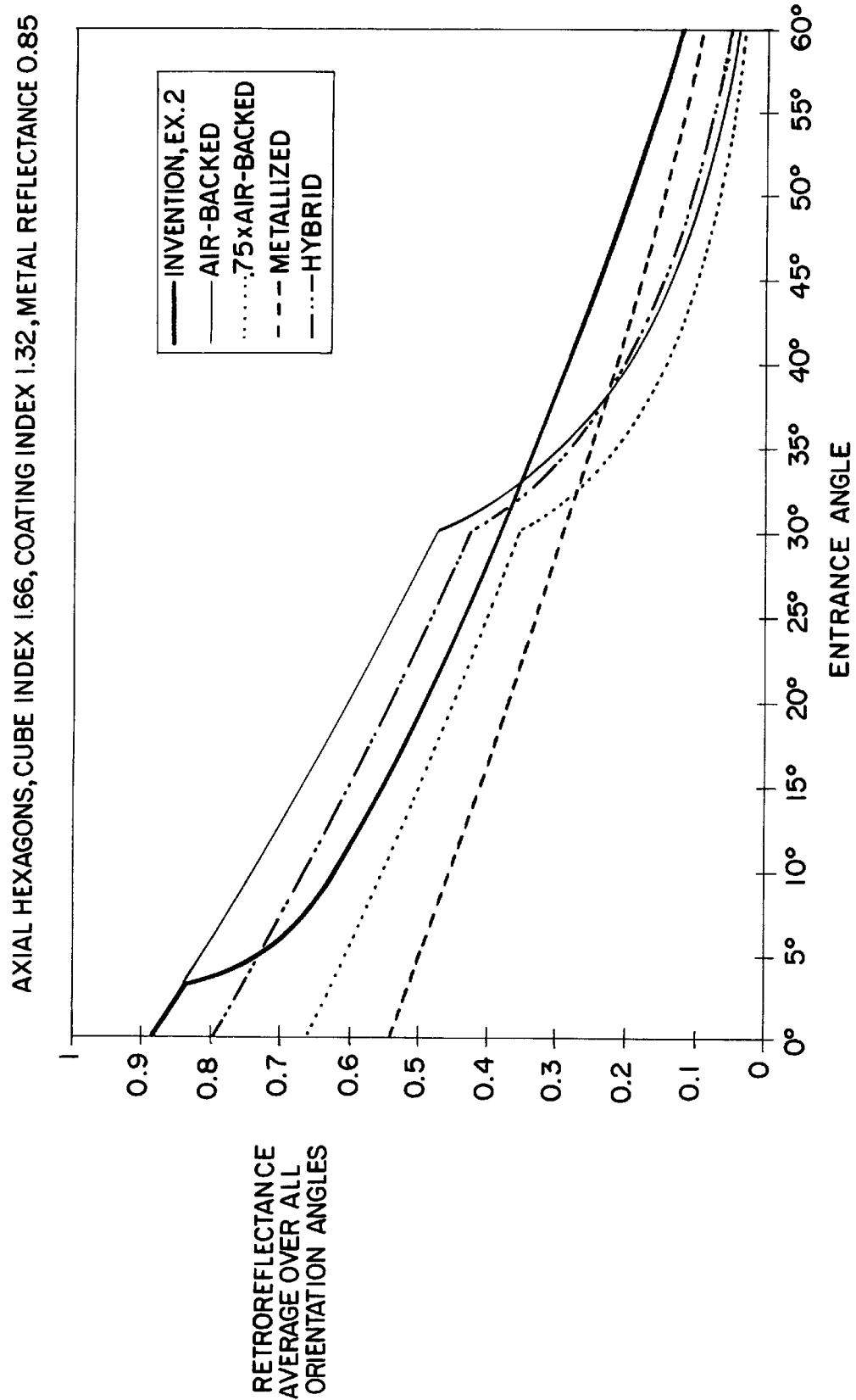

CHAMELEONIC CUBE CORNERS

BACKGROUND OF THE INVENTION

The invention is a solid three layer prismatic cube corner retroflector construction in which the mode of reflection at each cube face can shift from dielectric to metallic. Such construction achieves the high maximum retroflectance of air-backed constructions while exceeding the entrance angularity and equalling the structural integrity of metallized constructions.

Prismatic cube corner retroreflector constructions are well known in the safety products industry. Such constructions may be in the form of reflectors, which find utility in pavement markers, vehicle reflectors and like articles, or in the form of sheeting, which finds utility in highway signs, safety garments such as for highway construction workers, and the like. Such cube corner retroreflector constructions typically comprise a transparent material such as plastic or glass having a substantially smooth front surface, and a rear surface provided with a plurality of retroreflective cube corner elements. The front surface of the transparent material may be provided with a parallel-faced transparent overlay to impart a desired property to the retroreflector construction, such as abrasion resistance, weatherability, color, UV protection, and the like. Retroreflectors consisting of a single prismatic cube corner find use in range-finding, interferometry, and other optical instrumental applications.

For ideal efficiency, there is an air space behind the cube corner elements, so that all light that is incident on the cube corner retroreflector construction and which encounters the geometrically active portions of the three mutually perpendicular faces of each cube corner element is internally reflected and returned to the front surface of the article. This ideal dielectric face reflectivity is referred to as total internal reflection (TIR). It is recognized in the art, however, that depending on the light's internal incidence angles on the faces, which depends in turn on factors such as the light entrance angle and the orientation of the light entrance angle with respect to the cubes, not all incident light which encounters geometrically active portions of the three faces will be totally internally reflected. For air-backed constructions, there must be TIR at all three faces for the cube to retroreflect significantly. Air-backed cubes may achieve this at smaller entrance angles, but not at larger entrance angles. The TIR performance over a range of entrance angles for any given cube corner retroreflector will also be influenced by the cube axis cant and the index of refraction of the cube corner material. For entrance angles where TIR is not achieved, one or even two of the three faces of the air-backed cube corner elements will allow substantial light to pass through the face and be "lost." To prevent this loss of light, it is common to apply a reflective metallic layer such as vacuum deposited aluminum to the rear surface of the cube corner elements. Such a construction is shown, for example, in U.S. Pat. No. 4,486,363.

Metallization allows the retroreflective construction to be sealed along the back surface, to prevent dirt and moisture from penetrating the construction; any such dirt or moisture would destroy reflectivity at its point of contact with the back surface of cube corner elements reliant on TIR. Metallization also allows the back surface to be fully supported (such as by the well-known "potting" technique) to give additional strength to the overall reflector construction. Metallization has the disadvantage, however, of reducing the overall retroreflectance of the article. Unlike TIR, for which reflectance is 100%, aluminum has a reflectance of only about 85%. For a retroreflected ray of light that is reflected off of three aluminized faces, the intensity will be reduced to no more than about $(85\%)^3$, or about 61% of the corresponding TIR intensity.

Air-backed cube corner constructions of the prior art can achieve TIR, but the presence of such air spaces can compromise the structural integrity, i.e., the strength, stability and durability,. of the retroreflector construction. For some applications, such air spaces can be created by making the transparent material very thick and self-supporting, such as in vehicle taillight reflectors. In applications where the transparent material must be thinner and yet stronger, such as pavement marker reflectors, these air spaces can be created by ribs extending rearwardly of the cube corner elements to define "cells", each cell containing one or more cube corner elements. The ribs give strength to the retroreflector construction. Such ribs are disclosed, for example, in U.S. Pat. No. 4,208,090. In sheeting constructions, it is known to provide a protective backing over the back surface of the cube corner elements and to seal that backing to the sheeting in a pattern to produce discrete cells containing isolated clusters of cube corner elements, such as is shown, for example, in U.S. Pat. No. 4,618,518. In sheeting having a "cell" construction, any damage to the article allowing penetration of dirt or moisture will be limited to only those cube corner elements in the damaged cells. The area taken up by the ribs or cell walls, however, is typically not retroreflective, and so it decreases the overall retroflectivity of the article. This cell wall loss is greatly reduced in hybrid constructions in which the cell walls themselves contain metallized cube corners, such as are disclosed in U.S. Pat. No. 4,801,193. In such articles, some of the cube corners function by total internal reflection at air interfaces, and the remaining cube is corners function by metallic reflection. Articles made according to U.S. Pat. No. 4,801,193, like all reflector and sheeting constructions that provide sealed air spaces behind the cube corner elements, are mechanically weaker and thermally less stable than solid constructions. Articles made according to U.S. Pat. No. 4,801,193 have the particular problem of force concentrations, through the cell walls, on the metallized cube corners therein.

U.S. Pat. No. 4,703,999 discloses a sheeting construction having a metallic reflective layer having a pattern of hollow cube corner elements and being closely spaced from the rear surface of a thermoplastic layer having an identical pattern of prismatic retroreflective elements, the two layers being disposed relative to one another such that the patterns of cube corners are in mating parallel relationship. This construction, while perhaps theoretically desirable, is impractical to manufacture because it is difficult, if not impossible, to establish and maintain the exact mating parallel relationship between the patterns of cube corner elements on the two layers. The slightest misalignment of the layers in any direction will destroy the large entrance angle functionality of the cube corner elements. Furthermore, the construction shares the mechanical disadvantages of all air cell constructions.

It is thus one object of the invention to provide a retroreflector construction having the retroreflective performance over smaller entrance angles as is found in constructions having air-backed cube corner elements, yet having improved retroreflective performance at larger entrance angles, and good structural integrity, including good mechanical strength and thermal stability, as is found in metallized constructions.

It is another object of the invention to provide such a retroreflector construction having no air cells.

Other objects, advantages and novel features of the instant invention will be readily understood by those of skill in the art in view of the description and drawings herein.

SUMMARY OF THE INVENTION

In accordance with the invention, a cube corner retroreflector construction comprises a first transparent layer having a relatively high index of refraction, the first layer having a front surface and a rear surface, the front surface optionally having a transparent parallel-faced overlay, and the rear surface having one or more retroreflective cube corner elements provided thereon; a second transparent layer comprising a thin coating of substantially constant thickness in substantially uninterrupted contact with the rear surface of the first layer, the second layer having an index of refraction substantially lower than that of the first layer; and a third reflective metallic layer in substantially uninterrupted contact with the second transparent layer such that the second transparent layer is disposed between the first transparent layer and the third metallic layer. The ratio of the refractive indices of the first and second transparent layers is sufficient to allow total internal reflection at their interface for at least some of the cube corner faces even at large entrance angles, and thus provides improved retroreflector performance compared to prior art metallized constructions which lack the second transparent layer. The index of refraction of the optional transparent overlay is inconsequential to the optical functioning of the invention, and to simplify the explanation herein, it can be assumed to have the same index of refraction as the layer denominated herein as the first layer.

The cube corner retroreflector construction of the instant invention advantageously does not require air spaces or cells behind the cube corner elements, so there are no cell walls to cause loss in retroreflectivity of the construction as a whole. Further, the solid construction of the instant invention allows the use of a solid support such as potting to provide the same structural integrity as is achieved in prior art metallized constructions having no air spaces. Because there are no air spaces, there is no risk of cell damage which would otherwise allow dirt, moisture, or other impurities to contact the back surfaces of the cube corner elements and destroy their retroreflectivity. Nor is the construction of the instant invention subject to the thermal instabilities inherent in air cell constructions.

DESCRIPTION OF THE DRAWINGS

FIG. 3 is a graph comparing calculated retroreflectance as a function of entrance angle for one embodiment of the inventive cube corner retroreflector construction, and corresponding prior art air-backed, metallized and hybrid constructions.

DETAILED DESCRIPTION OF THE INVENTION

As used in this patent, the term "entrance angle" means the angle between the direction of incident light at the reflector front face and the retroreflector axis. The retroreflector axis is a designated line segment from the retroreflector center that is usually chosen centrally among the intended directions of illumination, such as the direction of the road on which or with respect to which the retroreflector is intended to be mounted.

Thus, entrance angle is an incidence angle relativized to the intended use of the article.

Figure 1:
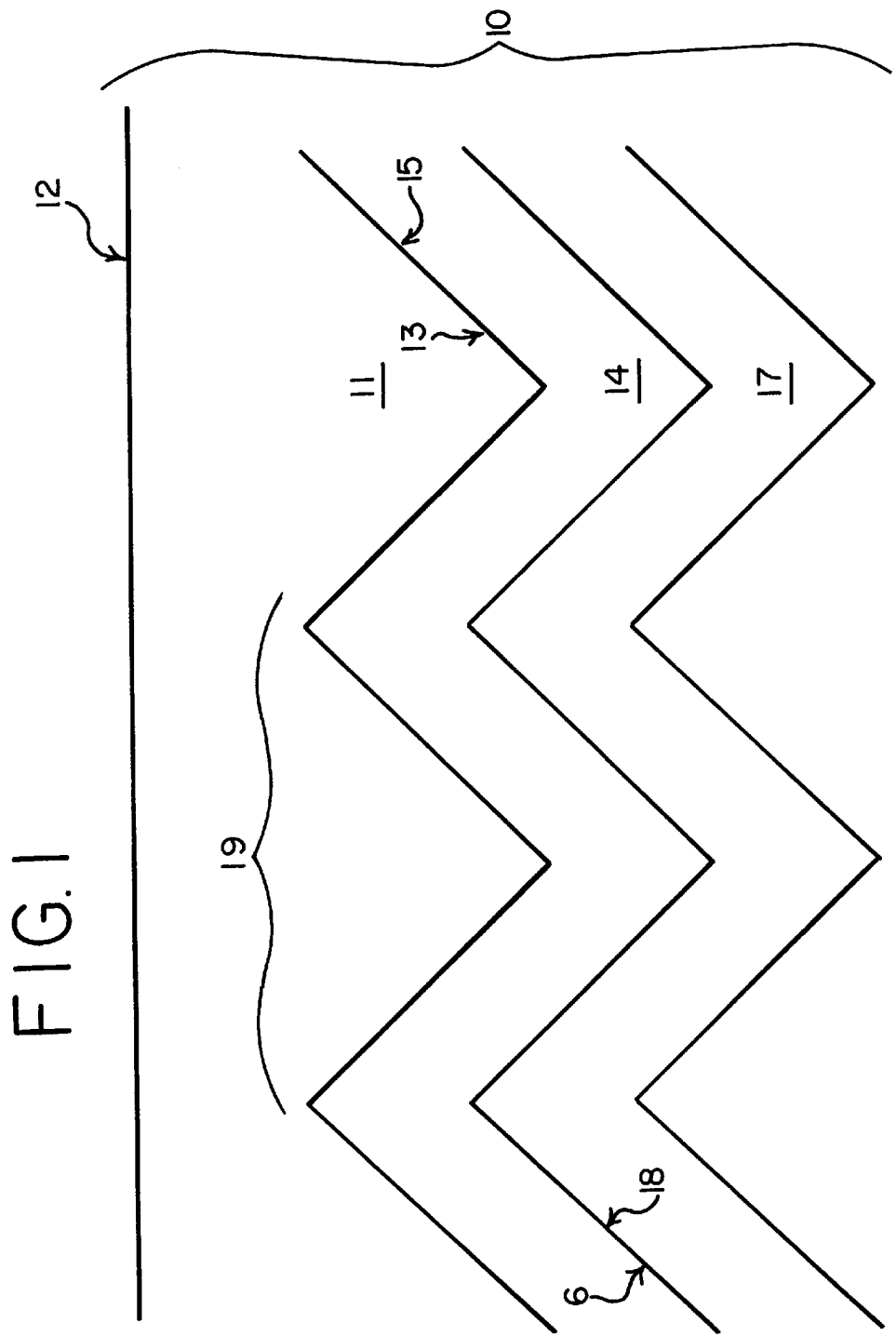
FIG. 1 is a diagrammatic cross-section of a cube corner retroreflector construction of the instant invention.

In accordance with the invention as illustrated in FIG. 1, a cube corner retroreflective construction 10 comprises a first transparent layer 11 having a substantially smooth front surface 12 for receiving incident light and a rear surface 13 having one or more retroreflective cube corner elements 19 thereon, said first layer 11 being of a material with a relatively high index of refraction; a second thin transparent layer 14 having a front surface 15 in substantially uninterrupted contact with the rear surface 13 of the first layer 11, the second layer 14 being of a material having an index of refraction substantially lower than that of the first layer 11; and a third reflective metallic layer 17 having a front surface 18 in substantially uninterrupted contact with the rear surface 16 of second transparent layer 14, such that the second layer 14 is disposed between the first and third layers 11 and 17. As noted above, in practical application the front surface 12 may be provided with a transparent parallel-faced overlay, which overlay is inconsequential to the optical functioning of the instant invention and is therefore omitted from the following discussion.

The first transparent layer 11 has a relatively high index of refraction, n. Suitable transparent materials include, for example, glass (n≧1.80), optical grade thermoplastics such as polyester (n=1.63), and an optical grade thermoset polyurethane (n=1.66) available from Mitsuitoatsu Corp. of Japan.

The first transparent layer 11 has one or more retroreflective cube corner elements 19 formed on its rear surface 13. Methods of making such cube corner elements are well known, both for reflector constructions and for sheeting constructions. In the case of sheeting, such cube corner elements can be formed by techniques well known in the art, such as the embossing method disclosed in U.S. Pat. No. 4,486,363 incorporated herein by reference in its entirety. Other known methods include casting and molding.

The second transparent layer 14 has a low index of refraction relative to that of the first transparent layer 11, and is in substantially uninterrupted contact with the rear surface 13 of first transparent layer 11. Second transparent layer 14 is preferably deposited in the form of a thin coating. One suitable material for second transparent layer 14 is cryolite, $Na_3AlF_6$, a mineral known to be useful in optical interference filters and having an index of refraction of about 1.32. Cryolite can be deposited over rear surface 13 by known means such as chemical deposition or vacuum deposition.

Second transparent layer 14 should be of substantially uniform thickness, so that the front surface 18 of the third metallic layer 17, in substantially uninterrupted contact with the rear surface 16 of second transparent layer 14, will have correctly formed mutually perpendicular cube corner faces, all in proper alignment with the cube corner elements 19 on the rear surface 13 of first transparent layer 11. Preferably, the second layer 14 should be thin relative to the dimensions of the cube corner elements, but should also be at least a few wavelengths thick to minimize light losses due to boundary wave effects. Thus, the instant invention relies on ordinary refraction and reflection, not on interference effects, such as are observed in prior art interference filters where the thickness of the cryolite layer is less than one wavelength of light and must be controlled much more carefully than in the instant invention. Generally, where the retroreflector construction of the instant invention is sheeting, second transparent layer 14 can be about 2–3 microns thick. Where the construction is a reflector with cube corners more than about 1 mm deep such as for use in pavement markers, the second transparent layer 14 can be thicker.

The third layer 17 is a reflective metal such as is known in the art of retroreflective cube corner constructions. Aluminum is most commonly used; silver and gold may also be suitable. Methods of metallizing a retroreflective construction, such as by vacuum deposition, are well known in the art.

In the constructions of the present invention, all of the cube corners function by total internal reflection some of the time and never function simply by metallic reflection. The cube corners of the present invention frequently function by having one or two faces reflecting by total internal reflection and two or one faces reflecting by metallic reflection. The cube corners are "chameleonic" in the sense that the mode of reflection at each cube face can shift from dielectric to metallic. The instant invention is distinguished from the hybrid construction of U.S. Pat. No. 4,801,193, wherein some cube corners function only by TIR at air interfaces, and the remaining cube corners function only by metallic reflection. Also, the constructions of the present invention have no air interfaces.

Figure 2:
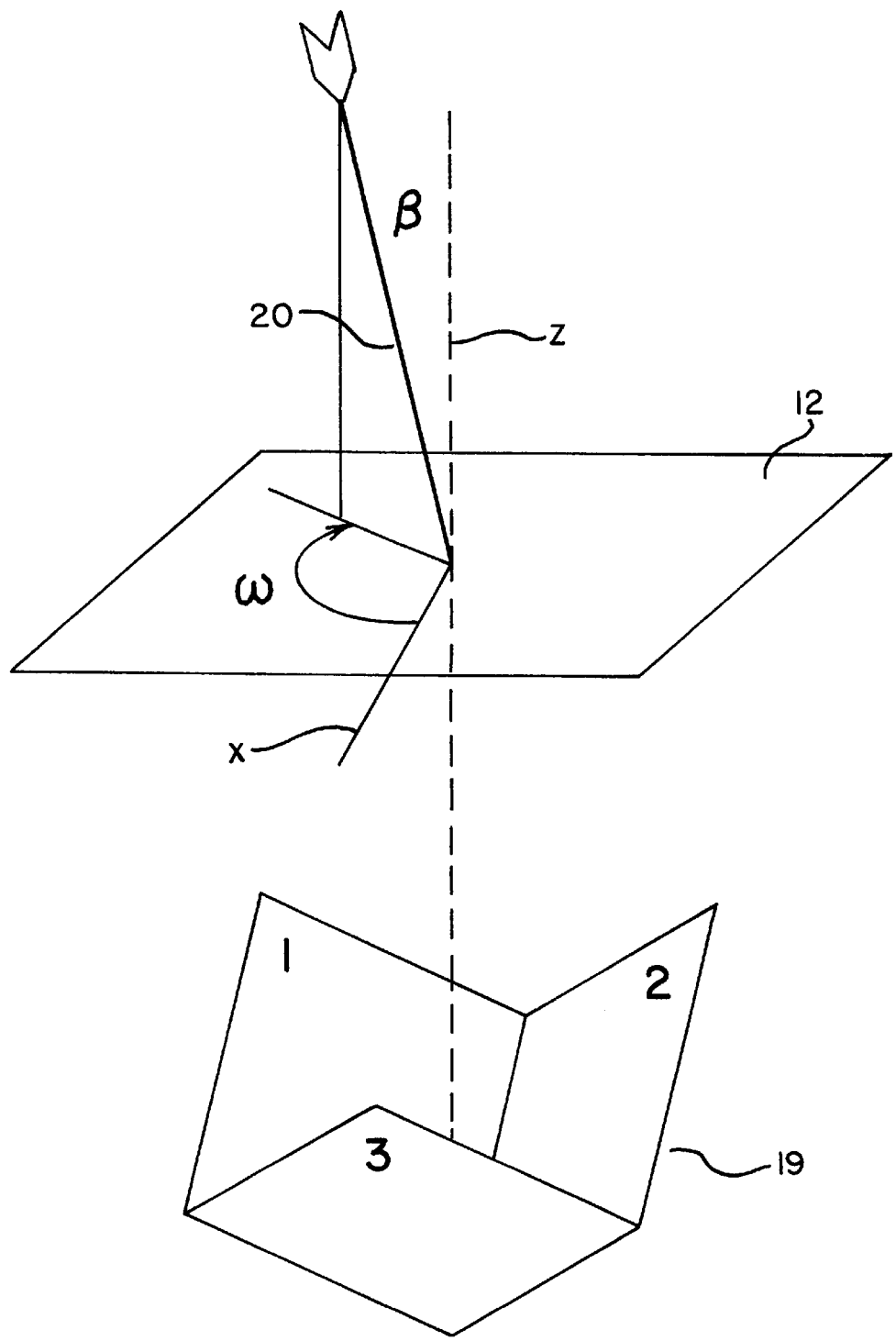
FIG. 2 is a geometrical illustration of a light ray incident on a retroreflector construction.

The performance of the retroreflector cube corner construction of the instant invention can be understood by reference to FIG. 2, which is a geometrical representation of a light ray incident on the first transparent layer 11 of the retroreflective construction 10. A light ray 20 meets the front surface 12 of first layer 11 at an entrance angle β measured with respect to axis z perpendicular to front surface 12, and at an orientation angle ω measured with respect to axis x, in surface 12 and corresponding to an edge of the cube corner. The ray is refracted by an amount determined by the index of refraction n of the material of which first transparent layer 11 is made. The refracted ray continues through first transparent layer 11 until it meets one of the three mutually perpendicular faces of cube corner element 19. For purposes of illustration, the three faces are labelled with integers 1, 2, and 3; it will be recognized, however, that these integer names do not necessarily define the order in which the refracted light ray encounters the three faces. For retroreflection, the refracted ray meets the first face, is reflected, meets the second face, is reflected, meets the third face, and is reflected. It meets each cube face at some generally different internal angle of incidence, which angle determines the efficiency of reflection at that face. Further, it can be proved geometrically that the internal incidence angle at which the refracted ray will meet the second and third faces that it encounters will be equal to the internal incidence angle that the ray would have made with that face if external ray 20 had been displaced, parallel to itself, so as to encounter, upon refraction, that face first. In other words, for each entrance angle β and orientation angle ω of rays reaching front surface 12 of article 10, there is a definite internal incidence angle associated with each of the three faces, regardless of the sequence in which the ray encounters the three faces.

Referring again to FIG. 2, if the three cube corner faces are indicated by the integer j=1, 2, 3, and the orientation angle ω is measured from the axis x coplanar with the edge between cube face 1 and cube face 2, then for a light ray 20 having an entrance angle β and orientation angle ω, the internal incidence angle which the refracted ray will eventually make upon face j is given by the formula:

$$\text{internal incidence angle} = \quad (A)$$

-continued $$\cos^{-1}\left(\frac{\sqrt{n^2 - \sin^2\beta} - \sqrt{2}\sin\beta\cos(\omega - j \cdot 120°)}{n\sqrt{3}}\right)$$

It will be understood that Equation A is for axial cube corners, i.e., cubes having a diagonal normal to the front surface of the first layer. Those skilled in the art will appreciate that Equation A can be generalized for non-axial cube corners also.

For the special case where the entrance angle β=0°, the internal incidence angles of the ray on all three faces will be the same, and will be defined by $$\text{internal incidence angle} = \cos^{-1}\left(\frac{1}{\sqrt{3}}\right) \quad (B)$$

From optics, the condition for total internal reflection is $$\text{internal incidence angle} \geq \sin^{-1}\left(\frac{n}{n'}\right) \quad (C)$$

where n is the index of refraction of the material of the first transparent layer and n' is the index of refraction of the material of the second transparent layer. Thus, for the special case where β=0° there will be total internal reflection provided that $$\cos^{-1}\left(\frac{1}{\sqrt{3}}\right) \geq \sin^{-1}\left(\frac{n'}{n}\right) \quad (D)$$

which is equivalent to $$\left(\frac{n}{n'}\right) \geq \sqrt{1.5} \quad (E)$$

From relationship E, it can be determined that if the second layer is cryolite having n'=1.32, then for β=0° the preferred index of refraction n of the first layer can be calculated as $$n \geq (\sqrt{1.5}) \times (1.32),$$

or, in other words, the preferred n is at least about 1.617.

Using Equations A and C above it is possible to calculate, for each entrance angle β and orientation angle ω, the internal incidence angle and thus the condition for total internal reflection at each cube face in terms of n/n'.

If $$n/n' < \sqrt{1.5},$$

and β=0°, then TIR will not occur at any of the three faces of the axial cube corner, and almost all reflection from the construction will be from the metallic layer. If β≠0° then even if n/n'<√1.5, TIR may occur at one or two of the three cubes faces, so the inventive construction will still perform better under those conditions than a metallized retroreflector of the prior art.

EXAMPLE 1

A prismatic cube corner retroreflector construction made in accordance with the instant invention has a first transparent layer made of polyester with an index of refraction n=1.63 and a second transparent layer of cryolite with an index of refraction n'=1.32. Applying relationship E, (n/n') =(1.63/1.32)=1.235, and $1.235 \geq \sqrt{1.5}$. Therefore, for light of entrance angle β=0°, the construction will have TIR at all faces. For the case, chosen for example, in which incident light has an entrance angle β=20° and an orientation angle ω=50°, the internal incidence angles of the light ray at each of the three cube corner faces 1, 2, and 3 can be calculated from Equation A to be 59.609°, 42.843°, and 62.975°, respectively. From Equation C, TIR will be achieved at any cube face where the internal incidence angle of the ray is $\geq \sin^{-1}(1.32/1.63)=54.078°$. In this Example, TIR will be achieved at faces 1 and 3, and the reflection at face 2 will involve the third metallic layer.

From the foregoing, it will be understood that retroreflective performance of the prismatic cube corner retroreflector construction of the instant invention will be determined at least in part by the ratio of the indices of refraction of the first and second transparent layers, i.e., depending on the internal incidence angle of the light meeting any cube face, the ratio may or may not be large enough for there to be TIR at that interface between the layers. For those faces at which TIR fails, the third metallic layer 17 serves to return most of the light that would otherwise pass through the transparent layers, and be lost. In other words, the third metallic layer functions as a "second chance" for internal incident light to be reflected.

EXAMPLE 2

Retroreflectance can be calculated for a prismatic cube corner retroreflector construction of the instant invention having axial hexagonal cubes and having a first transparent layer with index of refraction n=1.66; a second transparent layer with index of refraction of n'=1.32; and a third metallic layer having reflectance of r=0.85, or 85%. FIG. 3 illustrates the calculated retroreflectance of this embodiment of the invention as a function of entrance angle up to 60°, and includes for comparison the calculated retroreflectance of corresponding prior art constructions. Four curves are shown for prior art constructions utilizing the same axial hexagon cubes with n=1.66 and r=0.85 metallization. The first curve is for an air-backed construction assuming that no cell walls or ribs are necessary to maintain the air space. The second curve is the first curve multiplied by a factor of 0.75, to account for the fact that about 25% of the area of the construction will be taken up by either ribs or cell walls that are necessary to support the first transparent layer and maintain the air space. The third curve is for a prior art metallized construction, equivalent to the construction of the invention minus the second transparent layer. The fourth curve is for a prior art hybrid construction consisting of air-backed cubes, and within the cell walls themselves, metallized cubes, as disclosed in U.S. Pat. No. 4,801,193. This calculation for this construction assumes that 75% of the area is in the cells and 25% of the area is in the walls. For each curve of FIG. 3, the retroreflectance was calculated as an average over all orientation angles for each entrance angle. It should be noted that the calculated retroreflectance curves take into account the partial internal reflection, as given by the Fresnel equations for unpolarized light, wherever total internal reflection fails. Also, it should be noted that the curves account for specular reflection losses at the front surface 12 of the construction, based on the assumption, for sake of simplification, that any optional transparent overlay over front surface 12 has the same refractive index as layer 11.

As shown in FIG. 3, the retroreflectance of the Example 2 embodiment of the instant invention is superior to all other constructions at entrance angles greater than about 33°. It may be seen that the corresponding air-backed construction without cell walls would have superior retroreflectance over entrance angles from about 4° to about 32°, and the corresponding hybrid construction, as disclosed in U.S. Pat. No. 4,801,193, would have slightly superior retroreflectance over entrance angles from about 5° to about 31°, but these constructions lack the mechanical advantages of the present invention.

Although the cube corners of Example 2 are hexagonal, substantially similar comparisons with the prior art are obtained for triangular and other shapes of cube corners, since the internal incidence angles, and thus the modes of face reflection, are independent of cube shape.

Examples 1 and 2 considered only the total retroreflectance resulting from incoming light. Those skilled in the art know how to distribute the light within this total retroreflectance by means of geometric aberration of the cube corners, and it is known also that for micro-cube corners, such as are used in sheeting, optical diffraction significantly affects the distribution. The cube corners of the present invention, when functioning in mixed mode, produce diffraction patterns generally intermediate between dielectric and metallic cube corners, but with slight depression at 0° observation angle.

Thus it may be seen that applicant has disclosed a prismatic cube corner retroreflector construction having superior optical efficiency over a wide range of entrance angles, and at the same time having the structural integrity, including mechanical strength and thermal stability, necessary for practical utility in demanding applications such as pavement markers and sheeting. Further, the foregoing description is intended by way of illustration and not by way of limitation. Those skilled in the art will recognize other embodiments which, while different from the foregoing, do not depart from the scope of the invention herein described and claimed. For example, the first and second transparent layers could be laminated of different materials which otherwise meet the required optical properties described herein. In particular, any of the specific structural elements disclosed may be replaced by other known elements having equivalent function.

I claim:

1. A solid cube corner retroreflector construction comprising a first transparent layer having a front surface and a rear surface, said rear surface having formed thereon one or more retroreflective cube corner elements, a second transparent layer in substantially uninterrupted contact with the rear surface of said first layer and substantially conforming to the shape of the retroreflective cube corner elements thereon, said second layer being formed of a material of significantly lower index of refraction than said first layer, and a third reflective metallic layer in substantially uninterrupted contact with said second layer, such that said second layer is disposed between said first layer and said third layer.

2. The retroreflector construction of claim 1 wherein said front surface of said first layer is provided with a parallel-faced transparent overlay.

3. The retroreflector construction of claim 1 wherein said material of said first transparent layer is selected from the group consisting of glass, polyester, and polyurethane.

4. The retroreflector construction of claim 1 wherein the material of said second transparent layer is cryolite.

5. The retroreflector construction of claim 4 wherein said first layer has an index of refraction of at least about 1.617.

6. The retroreflector construction of claim 1 wherein the ratio of the index of refraction of the material of said first layer to the index of refraction of the material of said second layer is at least about $\sqrt{1.5}$.

7. The retroreflector construction of claim 1 wherein the material of said third layer is selected from the group consisting of aluminum, silver and gold.

8. The retroreflector construction of claim 1 wherein said construction is a reflector for a pavement marker.

9. The retroreflector construction of claim 1 wherein said construction is sheeting.

10. The retroreflector construction of claim 9 wherein said second layer has a thickness in the range of about 2–3 microns.

11. The retroreflector construction of claim 1 having a single retroreflective cube corner element.

12. A method of making a solid retroreflector construction, said method comprising providing a first transparent layer having a front surface and a rear surface, said rear surface having formed thereon one or more retroreflective cube corner elements;

providing a second transparent layer in substantially uninterrupted contact with the rear surface of said first layer and substantially conforming to the shape of the retroreflective cube corner elements thereof, said second layer being formed of a material of substantially lower index of refraction than said first layer; and providing a third reflective metallic layer in substantially uninterrupted contact with said second layer, such that second layer is disposed between said first layer and said third layer.

13. The method of claim 12 wherein said construction is sheeting and said cube corner elements are provided by embossing.

14. The method of claim 12 wherein said construction is sheeting and said cube corner elements are provided by casting.

15. The method of claim 12 wherein said first transparent material is selected from the group consisting of glass, polyester and polyurethane.

16. The method of claim 12 wherein said second layer is cryolite.

17. The method of claim 12 wherein said second layer is provided by a technique selected from the group consisting of vacuum deposition and chemical deposition.

18. The method of claim 12 wherein the ratio of the index of refraction of the material of the first layer and the index of refraction of the material of the second layer is at least about $\sqrt{1.5}$.

19. The method of claim 12 wherein the material of the third layer is selected from the group consisting of aluminum, silver, and gold.

20. The method of claim 12 including the step of providing a transparent parallel-faced overlay over the front surface of said first transparent layer.

* * * * *